Aug. 25, 1931.  C. NEWMAN ET AL  1,820,626
OUTLET RECEPTACLE
Filed Nov. 9, 1928
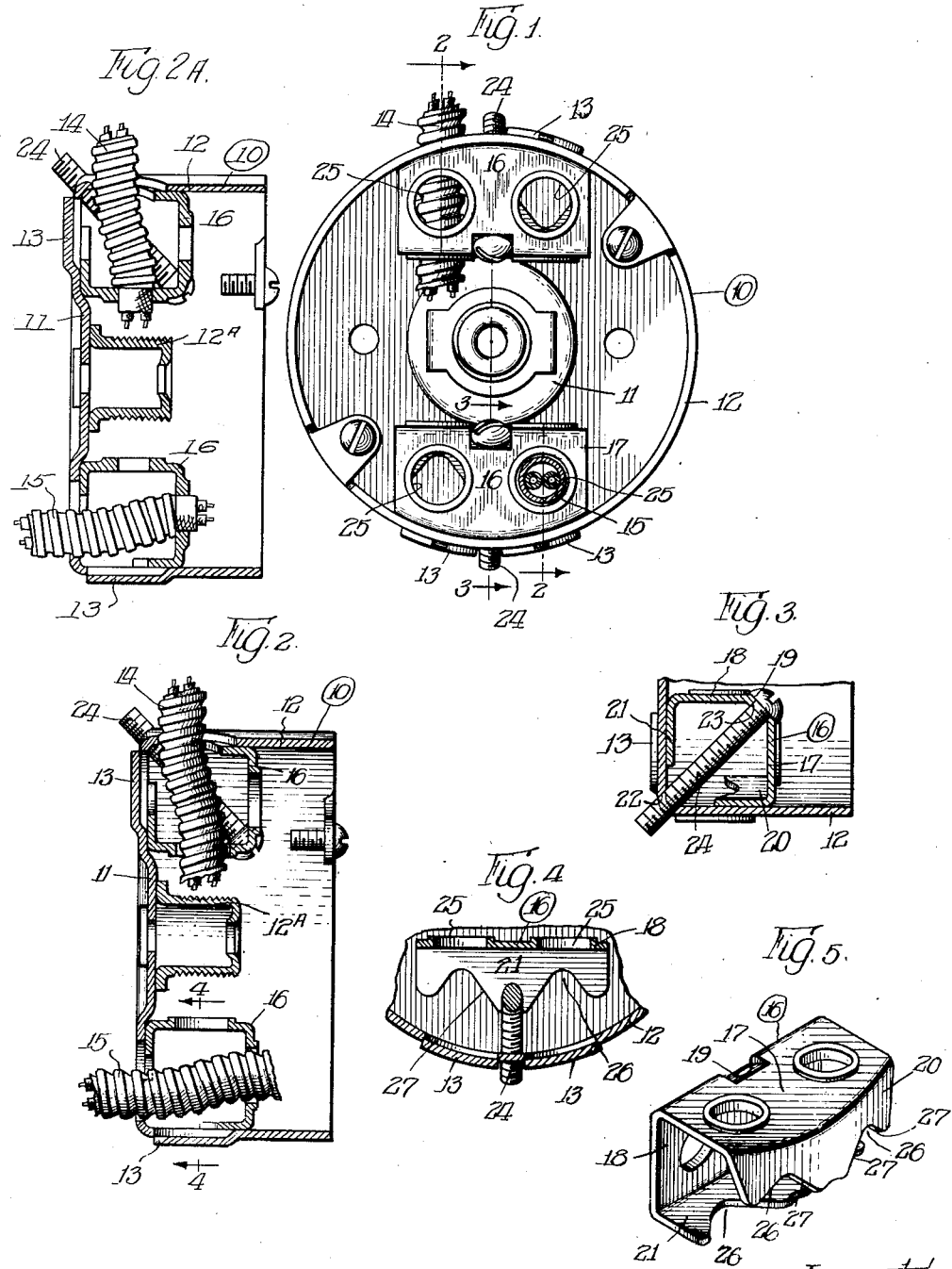
Inventors:
Charles Newman,
Ernst G. Appleton,
By Wilkinson, Huxley, Byron & Knight.
Attys.

Patented Aug. 25, 1931

1,820,626

UNITED STATES PATENT OFFICE

CHARLES NEWMAN, OF NEW YORK, N. Y., AND ERNST G. APPLETON, OF CHICAGO, ILLINOIS, ASSIGNORS TO ROACH-APPLETON MANUFACTURING COMPANY, OF CHICAGO, ILLINOIS, A CORPORATION OF ILLINOIS

OUTLET RECEPTACLE

Application filed November 9, 1928. Serial No. 318,117.

The present invention relates to outlet receptacles.

More particularly the present invention relates to outlet receptacles or switch boxes suitable for electric house wiring. It is common practice to enclose the two wires of an electric house wiring circuit within an armoring cable, which cable leads into an outlet receptacle or switch box. The wires within said armoring cable are connected within said outlet receptacle or switch box to the wires of an electric fixture. Various types of means have been devised for clamping said armoring cable in position relative to said outlet box or receptacle, said means commonly having the function of closing more or less completely the aperture in the receptacle or switch box through which said cable enters.

An object of the present invention is to provide an outlet receptacle provided with simple clamping means for accommodating cable entering said receptacle at various angles.

A further object is to provide an outlet receptacle having convenient clamping means which not only secures the cable in position, but effectually closes up the aperture through which said cable enters said receptacle.

A further object is to provide an outlet receptacle having clamping means requiring a minimum of effort on the part of the artisan who mounts said cable in cooperative relationship with the outlet receptacle and involving a minimum of liability that parts of said clamping means will become misplaced.

Further objects will appear as the description proceeds.

Referring to the drawings—

Figure 1 is a plan view showing the open side of an outlet receptacle embodying the principles of the present invention, said receptacle having an armoring cable entering same;

Figure 2 is a sectional view taken along the planes indicated by the arrows 2—2 of Figure 1, and showing two armoring cables to illustrate how the present invention provides for the accommodation of cables approaching the outlet receptacle from different directions;

Figure 2A is a view similar to Figure 2 but showing a more usual arrangement of armoring cables relative to the clamping or anchoring means within the receptacle, the armoring cable being substantially in end abutting relationship with the clamping or anchoring means, the wire or wires within said armoring cable extending through an aperture or apertures in said clamping means;

Figure 3 is a fragmentary sectional view taken along the plane indicated by the arrows 3—3 of Figure 1;

Figure 4 is a sectional view taken along the plane indicated by the arrows 4—4 of Figure 2; and Figure 5 is a view in perspective illustrating a clamping member which is useful in the combination illustrated in the preceding figures.

The numeral 10 indicates an outlet receptacle, which outlet receptacle is provided with the top wall 11 and the side wall 12, which side wall, in the illustrated embodiment of the present invention, is cylindrical in contour. It will be understood, however, that the invention is not limited to a receptacle having a cylindrical contour, but has a broader application. Secured to the top wall 11 is the fixture stud 12A, which may be secured to said wall 11 or otherwise supported, the means of support of said stud 12A having no relation to the invention claimed herein. Said stud 12A is provided for the purpose of supporting an electric fixture or the like. The top wall 11 and the side wall 12 are provided with the knock-outs 13, said knock-outs being of the usual circular form and being partially severed from the material of the outlet receptacle, whereby any of said knock-outs may be readily removed to provide an aperture for the entry of armoring cable. The term "knock-out" is to be construed in its broad popular sense. It is immaterial in the practice of the present invention whether the members 13 are designed to be knock out, pried out, or removed in any other way. Figure 1 illustrates an armoring cable, indicated by the numeral 14, entering the side wall 12 of the receptacle 10. Figure 2 represents two armoring cables 14 and 15, the cable 14 entering the side wall of the box and the cable 15 entering the top wall of the box.

According to the present invention, the knock-outs 13 in the wall 12 are arranged in pairs, and the top wall 11 is provided with corresponding pairs of knock-outs, the plane including the axes of two knock-outs in the top wall 11 and side wall 12 being in parallel relationship with the plane including the axes of the adjacent knock-outs in said top wall 11 and side wall 12. Expressed in other language, the outlet receptacle 10 is provided with a plurality of sets of knock-outs, adjacent knocks-outs in the top wall 11 having corresponding knock-outs in the side wall 12, the spacing between the knock-outs in the top wall 11 being substantially the same as the spacing between the corresponding knock-outs in the side wall 12.

By reason of the construction referred to, it is feasible to provide a single clamping member for cooperation with armoring cable entering the receptacle 10 either through an aperture provided by a knock-out in the side wall 12 or through the adjacent aperture provided by an adjacent knock-out in the top wall 11.

The present invention contemplates a clamping member, indicated as a whole by the numeral 16, which clamping member comprises the side walls 17 and 18 in substantial right-angular relationship with one another, said walls at their intersection being provided with a flat portion 19. The outer extremity of the wall 17 is provided with the flange 20 normal to said wall 17, which flange 20, in the illustrated embodiment of the present invention, is curved to conform to the cylindrical contour of the side wall 12. The outer extremity of the wall 18 is provided with the flange 21 normal to said wall 18. Said flanges 20 and 21, it will be noted, extend in the general direction of the intersection between the walls with which said flanges cooperate. Each of said flanges is adapted to abut broadside against the neighboring wall of the outlet receptacle. The edge of the outlet receptacle defined by the side wall 12 and top wall 11 is provided with a plurality of screw-threaded apertures disposed substantially symmetrically between the knock-outs 13 of said sets of knock-outs. Said screw-threaded apertures are indicated by the numeral 22. The flat portion 19 of each of the clamping members 16 is provided with an aperture 23 for receiving the screw 24, adapted to be threaded into said screw-threaded aperture 22. According to the illustrated embodiment of the present invention, two clamping members 16 are provided. It will be noted that each of said clamping members 16—16 is provided with a plurality of apertures 25—25. Each wall 17 of each of said clamping devices 16 is provided with a pair of apertures 25—25, and each wall 18 is likewise provided with a pair of said apertures 25—25. Said apertures 25—25 are of sufficient size to permit the passage of the armoring cable 14 or 15.

By reference to Figure 5 it will be clear that the flange 20 and the flange 21 are both provided with notches 26—26. Said notches are located in position to receive the armoring cable 14 or 15 entering through any of the knock-outs 13. Said notches 26—26 are defined by jaws 27—27 adapted to have gripping relationship with said armoring cable.

The functions of the above described embodiment of the present invention will be clear without detailed explanation. The screw 24 associated with each of the clamping members 16 will be sufficiently long to permit the easing up of the corresponding clamping member 16 to permit the ready entry of the armoring cable 14 or 15, which armoring cable enters the outlet receptacle through one of the apertures provided by the knock-outs 13. Said armoring cable enters one of the notches 26 and passes through one of the apertures 25 in the corresponding clamping member 16. The screw 24 is then tightened, causing the flanges 20 and 21 to approach their corresponding walls 12 and 11, respectively, securely clamping the armoring cable within the aperture through which it enters the outlet receptacle. The jaws 27—27 defining the corresponding notch 26 securely grip said armoring cable. Moreover, the corresponding flange 20 or 21, as the case may be, effectually closes the clearance space between the exterior of the armoring cable and the aperture through which it enters the outlet receptacle, whereby if any sparks were to be formed within said receptacle, as for example by an electric short-circuit, said sparks would be prevented from passing through the aperture receiving the armoring cable 14 or 15. Inasmuch as ordinarily only one armoring cable will enter any one outlet receptacle, it will be necessary to remove only one knock-out 13. The net effect is, therefore, that the outlet receptacle is tightly closed for all intents and purposes in its top wall 11 and side wall 12. There are occasions, however, in which two cables enter the receptacle at regions adjacent to each other. The present invention is capable of handling such a situation whether both cables enter the top wall, or both cables enter the side wall, or whether one of said adjacent cables enters the top wall and the other of said cables enters the side wall. In any of the cases referred to, one clamping member 16 will clamp both cables as well as close the knock-outs through which said cables enter the receptacle.

By reason of the present invention the artisan is not required to handle separated parts in clamping the armoring cable 14 or 15 in position and in stopping up the aperture through which said armoring cable 14 or 15 enters the outlet receptacle. Consequently the time of the artisan on the job and the liability of misplacing essential parts of the assembly is reduced to a minimum.

Though a preferred embodiment of the present invention has been described in detail, many modifications will occur to those skilled in the art. It is intended to cover all such modifications that fall within the scope of the appended claims.

What is claimed is—

1. An outlet receptacle having two walls normal to each other, said two walls being provided with knock-outs adjacent to one another, and a clamping member adjacent to said two walls, said clamping member having clamping portions, comprising walls mounted normally to each other having cable gripping edges directed in the general direction of the intersection of said two walls of said receptacle, adapted to overlie portions of the apertures defined by said adjacent knock-outs and means for drawing said cable gripping edges toward said intersection.

2. An outlet receptacle having two walls normal to each other, said two walls being provided with knock-outs adjacent to one another, a clamping member adjacent to said two walls, said clamping member having clamping portions adapted to overlie portions of the apertures defined by said adjacent knock-outs and having gripping edges directed in the general direction of the intersection of said two walls of said receptacle, and screw means for exerting a force upon said clamping member midway between said two walls.

3. In combination, an outlet receptacle having two walls in normal relationship with each other, one of said walls being provided with an aperture for receiving armoring cable, and a clamping member provided with two clamping flanges in normal relationship with one another and adapted to abut broadside against said walls, said clamping flanges having cable gripping edges directed in the general direction of the intersection of said two walls of said receptacle, and means for drawing said cable gripping edges toward said intersection.

4. In combination, an outlet receptacle having two walls in normal relationship with each other, one of said walls being provided with an aperture for receiving armoring cable, a clamping member provided with two clamping flanges in normal relationship with one another and adapted to abut broadside against said walls, and screw-threaded means for exerting a force upon said clamping members along a line midway between said two walls.

5. In an outlet receptacle, in combination, a top wall, a side wall in normal relationship with said top wall, a pair of adjacent knock-outs in said top wall, a pair of adjacent knock-outs in said side wall, said top wall knock-outs being located in positions corresponding to the positions of said side wall knock-outs, and a clamping member cooperatively associated with said walls, said clamping member having a pair of gripping portions in normal relationship with each other, said gripping portions having notched portions adapted to overlie said knock-outs and to abut broadside against said walls.

6. In an outlet receptacle, in combination, a top wall, a side wall in normal relationship with said top wall, a pair of adjacent knock-outs in said top wall, a pair of adjacent knock-outs in said side wall, said top wall knock-outs being located in positions corresponding to the positions of said side wall knock-outs, a clamping member cooperatively associated with said walls, said clamping member having a pair of gripping portions in normal relationship with each other, said gripping portions having notched portions adapted to overlie said knockouts and to abut broadside against said walls, and screw-threaded means for exerting a clamping force to said gripping member in a line disposed midway of said walls.

7. In an outlet receptacle, in combination, a top wall, a side wall in normal relationship with said top wall, a pair of adjacent knock-outs in said top wall, a pair of adjacent knock-outs in said side wall, said top wall knock-outs being located in positions corresponding to the positions of said side wall knock-outs, a clamping member co-operatively associated with said walls, said clamping member having a pair of gripping portions in normal relationship with each other, said gripping portions having notched portions adapted to overlie said knock-outs and to abut broadside against said walls, and a screw-threaded member disposed substantially symmetrically between said walls for exerting a clamping action upon said clamping member.

8. A clamping member for an outlet receptacle comprising two walls in right-angular relationship with each other, said two walls having at their extremities flanges disposed in normal relationship with each other, each of said flanges being provided with cable gripping notches.

9. A clamping member for an outlet receptacle comprising two walls in right-angular relationship with each other, said two walls having at their extremities flanges disposed in normal relationship with each other, each of said flanges being provided with cable gripping notches, and screw-threaded means disposed midway between said walls.

10. A clamping member for an outlet receptacle comprising two walls in right-angular relationship with each other, said two walls having at their extremities flanges disposed in normal relationship with each other, each of said flanges being provided with cable gripping notches, and screw-threaded means disposed substantially symmetrically between said walls.

Signed by CHARLES NEWMAN, at New York, New York, the 1st day of November, 1928, and by ERNST G. APPLETON, at Chicago, Illinois, the 5 day of November, 1928.

CHARLES NEWMAN.
ERNST G. APPLETON.